(12) United States Patent
Kumabe

(10) Patent No.: US 11,494,221 B2
(45) Date of Patent: Nov. 8, 2022

(54) HARDWARE CONTROL CORE CONTROLLING OPERATION OF HARDWARE DEVICES BY EXECUTING DEVICE DRIVERS WITHIN THE HARDWARE CONTROL CORE USED BY VIRTUAL MACHINE CORES VIA SHARED MEMORY HAVING AN UPLINK AND DOWNLINK MEMORY

(71) Applicant: DENSO CORPORATION, Kariya (JP)

(72) Inventor: Seigou Kumabe, Kariya (JP)

(73) Assignee: DENSO CORPORATION, Kariya (JP)

( * ) Notice: Subject to any disclaimer, the term of this patent is extended or adjusted under 35 U.S.C. 154(b) by 316 days.

(21) Appl. No.: 16/816,813

(22) Filed: Mar. 12, 2020

(65) Prior Publication Data

US 2020/0210222 A1 Jul. 2, 2020

Related U.S. Application Data

(63) Continuation of application No. PCT/JP2018/031416, filed on Aug. 24, 2018.

(30) Foreign Application Priority Data

Sep. 21, 2017 (JP) .............................. JP2017-181565

(51) Int. Cl.
*G06F 9/455* (2018.01)
*G06F 9/54* (2006.01)
(Continued)

(52) U.S. Cl.
CPC ........ *G06F 9/45558* (2013.01); *G06F 9/45541* (2013.01); *G06F 9/46* (2013.01); *G06F 9/50* (2013.01); *G06F 9/54* (2013.01); *G06F 2009/45579* (2013.01); *G06F 2009/45583* (2013.01)

(58) Field of Classification Search
CPC ....... G06F 9/45558; G06F 2009/45579; G06F 2009/45583; G06F 9/45541; G06F 9/46; G06F 9/50; G06F 9/54
See application file for complete search history.

(56) References Cited

U.S. PATENT DOCUMENTS 10,102,017 B2 * 10/2018 Ganguly .............. G06F 9/45558
2006/0242442 A1 10/2006 Armstrong et al.
(Continued)

FOREIGN PATENT DOCUMENTS

JP 2004178115 A 6/2004
JP 2006302270 A 11/2006
(Continued)

*Primary Examiner* — Michael W Ayers
(74) *Attorney, Agent, or Firm* — Harness, Dickey & Pierce, P.L.C.

(57) ABSTRACT

A virtualization system in which a plurality of virtual machines operate on a single physical machine having a plurality of cores is provided. The virtualization system comprises: a plurality of hardware; a hardware control core that controls operation of the plurality of hardware; a plurality of virtual machine cores each operating a guest OS; and a shared memory that is a memory configured to be accessed by the hardware control core and the plurality of virtual machine cores concurrently and in parallel.

6 Claims, 4 Drawing Sheets

(51) Int. Cl.
*G06F 9/46* (2006.01)
*G06F 9/50* (2006.01)

(56) References Cited

U.S. PATENT DOCUMENTS

| | | | | |
|---|---|---|---|---|
| 2009/0240924 | A1 | 9/2009 | Yasaki et al. | |
| 2011/0179417 | A1* | 7/2011 | Inakoshi | G06J 1/00 |
| | | | | 718/1 |
| 2014/0229935 | A1* | 8/2014 | Mitra | G06F 9/455 |
| | | | | 718/1 |
| 2015/0146527 | A1* | 5/2015 | Kishore | H04L 47/115 |
| | | | | 370/230.1 |
| 2017/0103192 | A1* | 4/2017 | Hussey | G06F 21/57 |
| 2018/0101486 | A1* | 4/2018 | Lu | G06F 9/4812 |
| 2018/0137013 | A1* | 5/2018 | Poojary | G06F 3/067 |
| 2018/0210752 | A1* | 7/2018 | Tang | G06F 9/467 |
| 2018/0222321 | A1* | 8/2018 | Payne | G06F 3/0481 |
| 2018/0357091 | A1* | 12/2018 | Butcher | G06F 9/5077 |
| 2019/0004846 | A1* | 1/2019 | Li | G06F 9/45558 |
| 2019/0044828 | A1* | 2/2019 | Gasparakis | G06F 12/0864 |
| 2020/0409735 | A1* | 12/2020 | Grandhi | G06F 9/4812 |

FOREIGN PATENT DOCUMENTS

| | | | |
|---|---|---|---|
| JP | 2009230549 | A | 10/2009 |
| JP | 2010003257 | A | 1/2010 |
| JP | 2014149698 | A | 8/2014 |
| JP | 2015103129 | A | 6/2015 |

* cited by examiner

HARDWARE CONTROL CORE CONTROLLING OPERATION OF HARDWARE DEVICES BY EXECUTING DEVICE DRIVERS WITHIN THE HARDWARE CONTROL CORE USED BY VIRTUAL MACHINE CORES VIA SHARED MEMORY HAVING AN UPLINK AND DOWNLINK MEMORY

CROSS REFERENCE TO RELATED APPLICATION

The present application is a continuation application of International Patent Application No. PCT/JP2018/031416 filed on Aug. 24, 2018 which designated the U. S. and claims the benefit of priority from Japanese Patent Application No. 2017-181565 filed on Sep. 21, 2017. The entire disclosures of all of the above applications are incorporated herein by reference.

TECHNICAL FIELD

The present disclosure relates to a virtualization system, a virtualization program, and a storage medium that operate multiple guest OSs on a computer having an entity, thereby causing the computer to operate virtually as multiple computers.

BACKGROUND

Various virtualization systems have been proposed in which multiple guest OSs (Operating System) are operated on a physical machine, which is a computer having an entity, thereby virtually operating the physical machine as multiple computers. The virtual computer is a computer formed by logically dividing a computer having the entity (so-called physical machine). The virtual computer may also be referred to as a virtual machine or a logical computer. The guest OS is basic software for realizing the virtual machine.

SUMMARY

The present disclosure describes a virtualization system in which a plurality of virtual machines operate on a single physical machine having a plurality of cores. The virtualization system comprises: a plurality of hardware; a hardware control core that controls operation of the plurality of hardware; a plurality of virtual machine cores; and a shared memory.

BRIEF DESCRIPTION OF DRAWINGS

Objects, features and advantages of the present disclosure will become more apparent from the following detailed description made with reference to the accompanying drawings. In the drawings.

DETAILED DESCRIPTION

Figure 1:
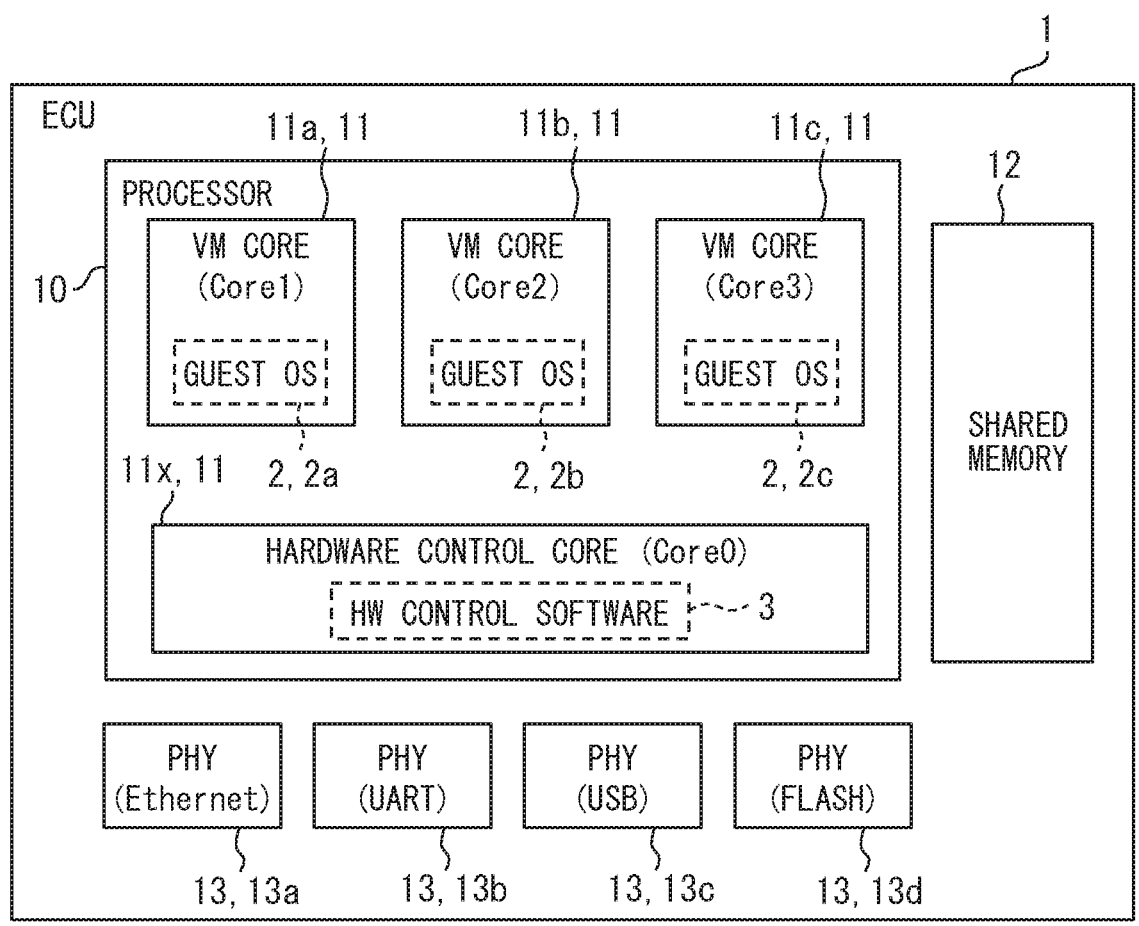
FIG. 1 is a block diagram showing a schematic configuration of an ECU according to the present embodiment.

Examples of the type of the virtualization system (in other words, system) include a hypervisor-type virtualization system and a host OS-type virtualization system. The hypervisor-type virtualization system is a virtualization system in which a guest OS is operated on an OS dedicated to virtualization (so-called hypervisor). The hypervisor operates directly on the hardware and controls allocation of computational resources to the guest OS and access to the hardware (so-called peripheral) by the guest OS.

In this example, the hardware corresponds to a physical layer for the OS. The hardware includes a configuration (so-called I/O devices) for converting a logical signal into an actual electric signal in an interface such as Ethernet (registered trademark) or UART, a flash memory, a hard disk, and so on. I/O devices corresponding to various communication standards are often implemented as chip sets (so-called PHY chips).

The host OS-type virtualization system is a virtualization system of the type in which another OS (that is, guest OS) is virtually operated as an application on the host OS. The host OS is basic software that operates on a physical machine. The host OS can also execute an application other than an application for operating the guest OS (a virtualization application). The virtualization application included in the host OS also plays a role of controlling an access to hardware by the guest OS. In other words, the virtualization application provided in the host OS is also software that provides the same function as a hypervisor.

For convenience in this application, software for controlling an access from the guest OS to the hardware without distinguishing between a virtualization application for providing a virtualization system of a host-type system and a hypervisor for providing a hypervisor-type virtualization system will be referred to as a hypervisor.

In general, each guest OS includes a device driver for using various types of hardware, and uses the hardware using the device driver. When a certain guest OS uses certain hardware, the guest OS and the hardware are associated with each other by the hypervisor in a 1:1 (one-to-one) relationship, and the other guest OS cannot be used.

A related art may describe, as a host OS-type virtualization system, a virtualization system including: a host communication device performing data input/output by a serial port communication on the host OS; a guest communication device performing data input/output by serial port communication on the guest OS; and a communication path securing device establishing a communication path between the host communication device and the guest communication device at the same time as the guest OS is activated, in order to improve stability of serial port communication between the host OS and the guest OS. Another configuration disclosed in a related art corresponds to a configuration in which the guest OS and the hypervisor are connected to each other by a communication pipe that conforms to a predetermined communication standard so as to be able to communicate with each other.

In a related virtualization system, allocation of computational resources to virtual machines and access to hardware by virtual machines are controlled by hypervisors. When a certain virtual machine uses certain hardware, the hypervisor associates the virtual machine with the hardware in a 1:1 correspondence, and the other virtual machines cannot be used.

Therefore, even if a virtual machine wants to use certain hardware, the hardware may not be immediately used depending on the operating conditions of other virtual machines. In other words, the real-time nature of a communication between the virtual machine and the hardware may be impaired.

The present disclosure describes a virtualization system, a virtualization program, and a storage medium capable of inhibiting a delay in communication between a virtual machine and hardware.

According to one aspect of the present disclosure, a virtualization system in which a plurality of virtual machines operate on a single physical machine having a plurality of cores may be described. The virtualization system may comprise: a plurality of hardware; a hardware control core which is a core of the cores, and controls operation of the plurality of hardware; a plurality of virtual machine cores which are cores of the cores, each operating a guest OS which is an OS of a virtual machine; and a shared memory that is a memory configured to be accessed by the hardware control core and the plurality of virtual machine cores concurrently and in parallel. One of the virtual machines is configured to operate exclusively with one or a plurality of the virtual machine cores. The hardware control core includes a device driver unit that is configured to control the operation of each of the plurality of hardware by executing a device driver corresponding to each of the plurality of hardware. A communication between the hardware control core and the virtual machine cores is performed by storing data in the shared memory and reading the stored data from the shared memory. The device driver unit controls the operation of the plurality of hardware based on the data in the shared memory stored by the virtual machines. The device driver unit stores data received from the hardware in the shared memory to provide the virtual machine cores with the stored data.

The above configuration corresponds to a configuration in which a communication between the virtual machine core and the hardware control core is realized by a memory access. In this manner, each virtual machine core can store data in the shared memory at an arbitrary timing. In addition, the device driver unit operates the hardware based on the data from the virtual machine core acquired by the memory access. Therefore, each virtual machine core can use desired hardware at any timing.

In addition, one virtual machine core is not shared by multiple guest OSs (in other words, virtual machines). In other words, each virtual machine operates exclusively with one or multiple cores. Each virtual machine can freely use the computational resources of the virtual machine core allocated to the virtual machine regardless of the operating conditions of other virtual machines.

In other words, according to the configuration described above, each virtual machine operates with the use of the computational resources provided in its own core, and can utilize desired hardware at any timing. This makes it possible to reduce the possibility of delaying the communication between the virtual machine and the hardware.

According to another aspect of the present disclosure, a program for operating as a virtualization system, a physical machine including a plurality of cores, a random access memory, and a physical layer having a plurality of hardware may be described. The program may comprise: a core allocation unit that sets one of the plurality of cores to the hardware control core and sets the remaining cores to the virtual machine core; and a shared memory set unit that sets a part or all of a storage area of the random access memory to the shared memory. Further, the non-transitory tangible computer readable storage medium stores the program that causes a computer to function as the virtualization system.

An embodiment of the present disclosure will be described with reference to the drawings. FIG. 1 is a diagram showing an exemplary hardware configuration and an exemplary software configuration of an electronic control device (ECU: Electronic Control Unit) to which a virtualization system according to the present disclosure is applied. An ECU 1 is mounted on a vehicle and connected to a network built in the vehicle. The ECU 1 corresponds to an example of a computing machinery.

The ECU 1 is configured as one physical machine, and as shown in FIG. 1, includes a processor 10 having four cores 11, a shared memory unit 12, and multiple hardware 13a to 13d. For convenience, when distinguishing the four cores 11 from each other, the cores 11 are described as a core 11a, a core 11b, a core 11c, and a core 11x. Core1 and Core2 in the drawing are labels for distinguishing the multiple cores 11 from each other. As an example, FIG. 1 illustrates an example in which the core 11x is a core 11 to which a label of Core® is allocated. When the various hardware 13a to 13d are not distinguished from each other, those hardware 13a to 13d are simply referred to as hardware 13. "PHY" in the drawings is a label indicating the hardware 13. In FIG. 1, illustration of control lines and information lines is omitted.

The ECU 1 may be realized with use of a single processor (that is, a multi-core processor) in which the multiple cores 11 are mounted, or may be realized with use of the multiple processors each having one core. Further, the ECU 1 may be realized by combining multiple multi-core processors together. In this example, it is assumed that the ECU 1 is realized with the use of a single processor (so-called quad core processor) having four cores 11.

In this example, the core 11 is a module having a single entity on which a logic circuit for performing arithmetic processing, a primary cache, and the like are mounted. Each core 11 is also referred to as a processor core or a physical core. In the present embodiment, the number of cores 11 included in the ECU 1 is four, but the number is not limited to four. The number of cores 11 provided in the ECU 1 may be appropriately designed. The number of cores 11 included in the ECU 1 may be five or more. The number of cores 11 included in the ECU 1 may be, for example, six.

The shared memory unit 12 is a memory region that can be accessed by each of the multiple cores 11 at the same time and in parallel. In other words, the shared memory unit 12 is a memory region shared by each of the cores 11. The shared memory unit 12 is realized with the use of a random access memory (hereinafter, RAM: Random Access Memory) or the like. The shared memory unit 12 is connected to each of the cores 11 through an interconnect mechanism such as a bus system, for example. As an interface for communication between the shared memory unit 12 and the core 11, an SGI or the like can be employed.

The multiple hardware 13 are configured to provide a physical layer for the processor 10. The multiple hardware 13 correspond to a peripheral for the processor 10. The hardware 13 is, for example, a device (so-called I/O device) for inputting information from the outside or outputting information to the outside when the ECU 1 is connected to an external device. The hardware 13 may be a non-volatile storage device such as a hard disk drive or a NOR flash memory.

For example, the hardware 13a is a circuit module that functions as a physical interface for Ethernet (registered trademark). In other words, the hardware 13a is a circuit module that converts a logical signal into an actual electrical signal or vice versa, in accordance with the Ethernet standard. The hardware 13b is a circuit module that functions as an interface for the UART. In other words, the hardware 13b converts the logical signal into the actual electric signal or vice versa in accordance with a UART standard. The hardware 13c is configured to function as an interface for a USB communication, for example, and converts the logical signal into the actual electrical signal or vice versa in accordance with a USB standard.

The hardware 13d is, for example, a NOR type flash memory. It is assumed that the NOR-type flash memory as the hardware 13d stores, for example, a program (hereinafter referred to as a boot program) Pm1 to be executed when the ECU 1 is booted, guest OSs 2a to 2c to be described later, and the like.

In addition, the ECU 1 may include I/O devices corresponding to various communication standards other than those described above, non-volatile storage media, and the like as the hardware 13. In addition, the ECU 1 includes a non-volatile storage medium that stores various application software. The application software may be stored in the NOR type flash memory described above. The type of hardware 13 to be provided in the ECU 1 may be appropriately designed. Various types of hardware 13 as a peripheral are connected to the processor 10 through, for example, a signal line (not shown). An intercommunication between the hardware 13 and the processor 10 may be provided by a bus system.

The ECU 1 having the components described above executes a predetermined startup process (so-called boot strapping) by powering the ECU 1 as a trigger, and causes one of the multiple cores 11 included in the ECU 1 to function as a core (hereinafter referred to as the hardware control core) 11x for controlling the operation of the hardware 13. For convenience, hereinafter, software for causing a certain core 11 to function as the hardware control core 11x is referred to as hardware control software 3. According to another aspect, the hardware control core 11x corresponds to the core 11 that executes a process as a communication interface between the virtual machine and the hardware 13 when the ECU 1 is operated virtually as multiple computers (specifically three computers).

Any one of the multiple cores 11 is used as the hardware control core 11x, that is, the core 11 to be operated as the hardware control core 11x may be set in advance. In this example, it is assumed that the core 11x is set to operate as the hardware control core 11x.

The ECU 1 also performs a startup process to allocate a predetermined guest OS 2 to each of the remaining core 11a to 11 c. The respective guest OSs 2 are basic software (so-called OS: Operating System) for causing the core 11 that execute the guest OS 2 to operate as one computer (that is, a virtual machine). Each of the cores 11 launches and performs a guest OS 2 allocated to the core 11. Each of the cores 11 is allocated a different guest OS 2 from each other. The guest OS 2a shown in the drawing is a guest OS 2 allocated to the core 11a, and the guest OS 2b is a guest OS 2 allocated to the core 11b. The guest OS 2c is a guest OS 2 allocated to the core 11b.

The guest OSs 2 to be allocated to the multiple cores 11a to 11c may be set in advance. Each of the cores 11 operates as an independent virtual machine (VM: Virtual Machine) by performing the guest OS 2 allocated to the core 11. For convenience, the core 11 to which the guest OS 2 is allocated is also referred to as the VM core 11. The core 11 used as the VM core 11 may be set in advance. The VM core 11 corresponds to a virtual machine core of the present disclosure.

The guest OS 2a allocated to the VM core 11a is, for example, an OS for operating a computer as a driving support ECU (hereinafter referred to as a driving support OS). The driving support ECU is an ECU that calculates a distance to an obstacle or the like based on various information from a sensor that captures the surrounding condition of the vehicle, such as an image sensor or a millimeter wave radar sensor, or determines whether or not the vehicle is protruding from a lane.

The VM core 11a executes the driving support OS, and also executes predetermined application software (hereinafter referred to as a driving support application) for providing a function as a driving support ECU. In other words, the VM core 11a executes the processing as the driving support ECU. The driving support application is stored in a flash memory or the like (not shown) in association with the driving support OS serving as the guest OS 2a. The driving support application may be stored in a state of being packaged with the driving support OS. The driving support application is sequentially read from the RAM or the like and executed by the VM core 11a after the driving support OS has been booted.

The guest OS 2b is, for example, an OS (hereinafter referred to as an ABS-OS) for operating a computer as an ABS-ECU. The ABS-ECU is an ECU that controls the operation of various actuators configuring an ABS (Antilock Brake System) based on the outputs of sensors mounted on the vehicle. The VM core 11b executes the ABS-OS and also executes predetermined application software (hereinafter referred to as an ABS application) for providing a function as the ABS-ECU. In other words, the VM core 11b executes a process as the ABS-ECU. The ABS application is stored in a flash memory or the like (not shown) in association with the ABS-OS serving as the guest OS 2b. For example, the ABS application may be stored in a state packaged with the ABS-OS. After the ABS-OS has been booted, the ABS application is read sequentially from the RAM and executed by the VM core 11b.

The guest OS 2c is, for example, an OS (hereinafter referred to as an EPS-OS) for operating a computer as an EPS-ECU. The EPS-ECU is an ECU that controls the EPS (Electric Power Steering) motor. The VM core 11c executes the EPS-OS, and also executes predetermined application software (EPS application) for providing a function as the EPS-ECU. In other words, the VM core 11c executes a process as the EPS-ECU. The EPS application is stored in a flash memory or the like (not shown) in association with the EPS-OS serving as the guest OS 2c. For example, the EPS application may be stored in a state of being packaged with the EPS-OS. After the EPS-OS has been booted, the EPS application is read sequentially from the RAM and executed by the VM core 11c.

Figure 2:
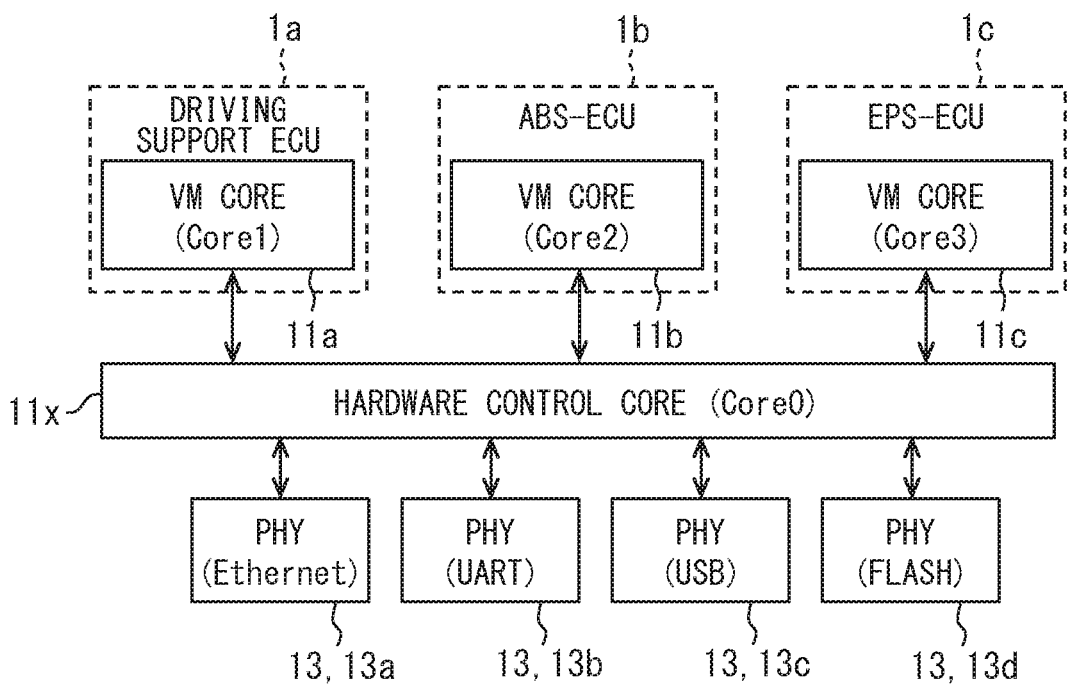
FIG. 2 is a block diagram illustrating a connection relationship between a virtual machine and hardware.

With the setting described above, the ECU 1 virtually operates as a driving support ECU 1a, an ABS-ECU 1b and an EPS-ECU 1c as shown in FIG. 2. Each of the driving support ECU 1a, the ABS-ECU 1b and the EPS-ECU 1c accesses various hardware 13 through the hardware control cores 11x in accordance with a procedure to be described later. Each of the driving support ECU 1a, the ABS-ECU 1b and the EPS-ECU 1c provided by each of the VM cores 11 is a virtual machine that provides a predetermined function.

The types of the guest OSs 2a to 2c allocated to the respective cores 11 may be appropriately designed, and are not limited to those exemplified above. In the present embodiment, as an example, the VM cores 11a to 11c are operated as an ECU that provides a function related to a vehicle travel control, such as traveling, curving, or stopping, but the present disclosure is not limited to the above example. For example, the VM core 11a may be operated as an ECU that provides a multimedia function such as a navigation apparatus or an audio device. The VM core 11a may be operated as a body-based ECU such as seats or power windows.

In addition, the VM core 11a may be operated as an ECU that provides a function for performing a communication with the outside of the vehicle. The ECU that provides a function for performing the communication with the outside of the vehicle is, for example, an ECU that performs a process of wirelessly accessing a wide area communication network, an ECU that performs a vehicle-to-vehicle communication, or the like. Similarly, the types of virtually realized ECUs provided by the VM cores 11b and 11c may be appropriately designed. The guest OSs 2 allocated to the respective VM cores 11a to 11c may be appropriately selected/designed according to the ECUs provided to the respective VM cores 11a to 11c. The guest OS 2 may be an OS for controlling a predetermined electronic devices mounted on the vehicle or an OS for providing a function related to the communication with the outside of the vehicle.

Further, the content of a specific process from a time when the ECU 1 is powered on to a time when the guest OSs 2a to 2c are booted may be designed as appropriate. The startup process includes the execution of a BIOS (Basic Input Output System) and the execution of a process corresponding to a boot loader. As a system firmware, an UEFI (Unified Extensible Firmware Interface) may be adopted instead of the BIOS. The programs to be executed when the ECU 1 is booted are preferably implemented in a concealed source code, which is uniquely created by a developer.

Figure 3:
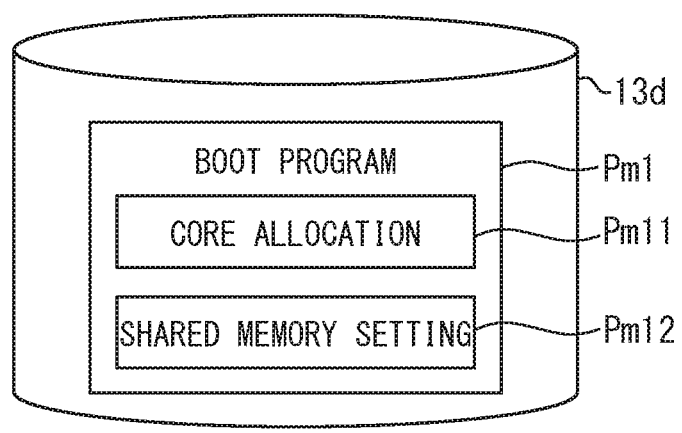
FIG. 3 is a diagram conceptually showing a schematic configuration of a boot program to be executed when the ECU is booted.

FIG. 3 is a block diagram of a program (that is, a boot program) Pm1 to be executed when the ECU 1 is booted. The boot program Pm1 includes a core allocation unit Pm11 and a shared memory set unit Pm12. The core allocation unit Pm11 is a program module for setting one core 11 among the multiple cores 11 to the hardware control core 11x and setting the remaining cores 11 to the VM cores 11a to 11c. The core allocation unit Pm11 causes the hardware control core 11x to execute the hardware control software 3. In addition, the core allocation unit Pm11 allocates the guest OSs 2 associated in advance, to the respective VM cores 11a to 11c, and boots the VM cores 11a to 11c. The shared memory set unit Pm12 is a program module for setting a part or all of a storage area included in the RAM in the shared memory unit 12.

The boot program Pm1 is stored in a flash memory (that is, a non-volatile storage medium) serving as the hardware 13d. Various non-transitory tangible storage media (non-transitory tangible storage medium) can be adopted as a storage device of the boot program Pm1. The boot program Pm1 itself may be executed by the hardware and the processor 10 cooperating with each other. The boot program Pm1 corresponds to a virtualization program of the present disclosure, and the storage device which stores the boot program Pm1 (in this example, the hardware 13d) corresponds to a storage medium of the present disclosure.

Next, an interaction between the hardware control core 11x and the VM core 11a after the startup process of the ECU 1 has been completed will be described with reference to FIG. 4. In this example, a software configuration and function (in other words, configuration and function as a software) of the VM core 11a among the VM cores 11a to 11c will be described as an example, but the other VM cores 11b to 11c are also the same.

First, the functions of the hardware control core 11x will be described. As shown in FIG. 4, the hardware control core 11x includes an inter-core communication unit F1 and a device driver unit F2. The inter-core communication unit F1 includes a read unit F11 and a storage processing unit F12 as finer functional blocks. The inter-core communication unit F1 is a configuration for the hardware control core 11x to communicate with each of the VM cores 11 (for example, the VM core 11a).

A communication between the hardware control core 11x and the VM core 11a is realized through the shared memory unit 12 (in other words, a memory access). If any hardware 13 is to be used, the VM core 11a stores the data (in other words, a bit string) for the hardware 13 in the shared memory unit 12, to thereby transfer the data to the hardware control core 11x. In addition, the hardware control core 11x stores data acquired from the hardware 13 in the shared memory unit 12, to thereby transfer the data to the VM core 11a. White arrows in FIG. 4 indicate a flow of the data.

Figure 4:
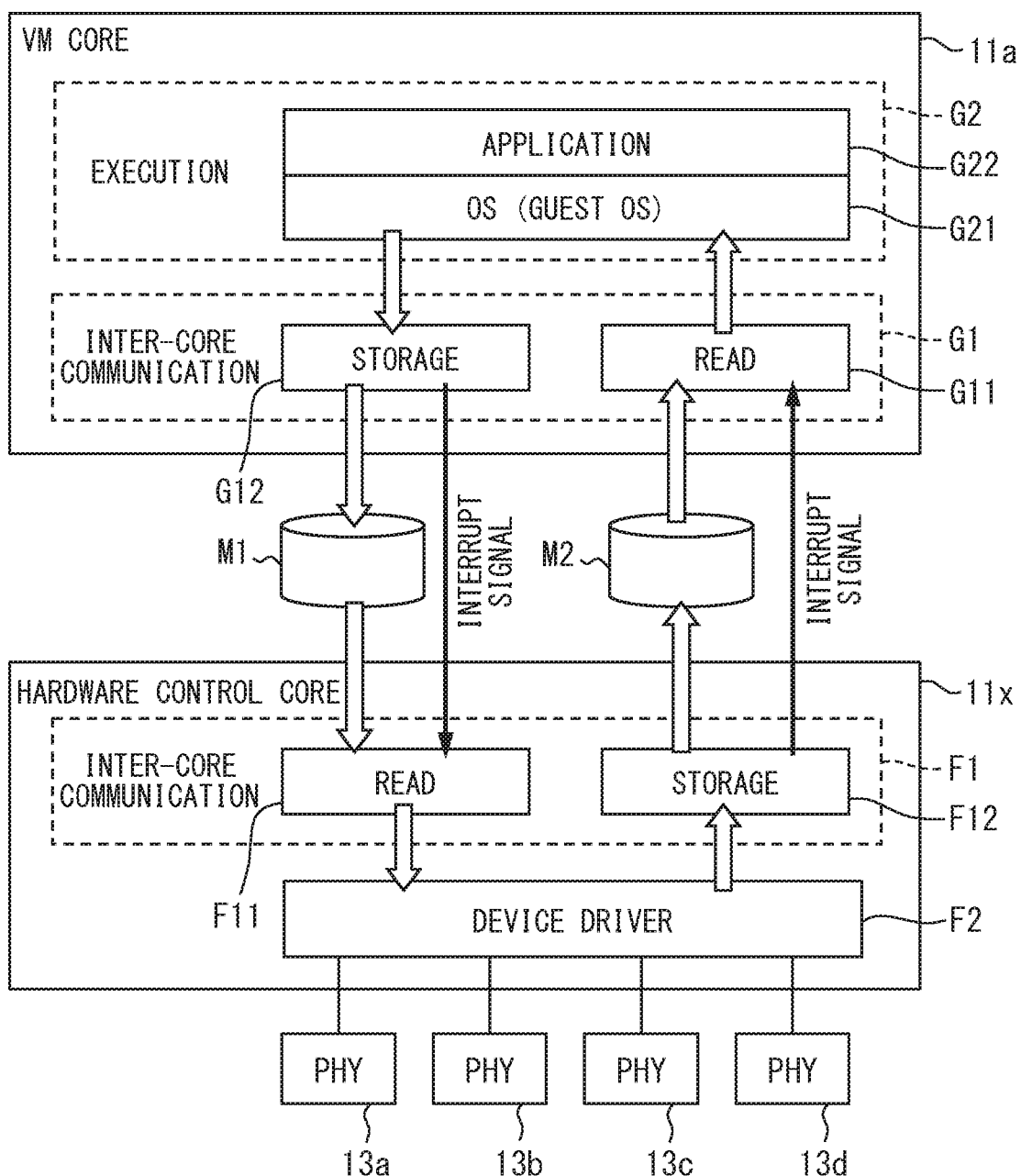
FIG. 4 is a diagram illustrating a peripheral access by the virtual machine.

A symbol M1 shown in FIG. 4 is indicative of a memory region (hereinafter, referred to as a downlink memory) in which data addressed to the hardware control core 11x from the VM core 11a is stored. Further, a symbol M2 is indicative of a memory region (hereinafter, referred to as an uplink memory) in which data addressed to the VM core 11a from the hardware control core 11x is stored. The downlink memory M1 and the uplink memory M2 may be implemented with the use of memories independent of each other in a hardware fashion, or may be implemented in a software fashion (in other words, logically). The downlink memory M1 and the uplink memory M2 may be provided for each of the VM cores 11 (in other words, for each guest OS 2 and each virtual machine).

The hardware control core 11x is configured to be able to execute writing, reading, deleting of data with respect to the uplink memory M2, and is configured not to write data with respect to the downlink memory M1. In other words, the hardware control core 11x is prohibited from storing the data in the downlink memory M1. The hardware control core 11x is configured to be able to execute only reading of the stored data with respect to the downlink memory M1.

The VM core 11a is configured to be able to execute the writing, reading, and deleting of data with respect to the downlink memory M1, and is configured not to write the data with respect to the uplink memory M2. In other words, the VM core 11a is prohibited from storing the data in the uplink memory M2. The VM core 11a is configured to be able to execute only the reading of the data stored in the uplink memory M2.

The read unit F11 included in the inter-core communication unit F1 is configured to read the data stored in the downlink memory M1. The read unit F11 outputs the data read from the downlink memory M1 to the device driver unit F2. The read unit F11 corresponds to a controller read unit of the present disclosure.

The storage processing unit F12 is configured to store the data in the uplink memory M2. The storage processing unit F12 stores the data received by the device driver unit F2, which will be described later, in the uplink memory M2 as it is (that is, raw data), and outputs an interrupt signal to the VM core 11a. The interrupt signal is a signal requesting reading of the stored data. The VM core 11a refers to the uplink memory M2 based on the reception of the interrupt signal output from the storage processing unit F12, and reads out the stored data. It is assumed that the output of the interrupt signal associated with the data storage in the uplink memory M2 is performed without delay (that is, as quickly as possible) with respect to the completion of the data storage in the uplink memory M2. The storage processing unit F12 corresponds to a controller storage processing unit of the present disclosure.

The device driver unit F2 is configured to execute device drivers corresponding to various types of hardware 13. In other words, the device driver unit F2 performs a mutual communication with the various hardware 13, and operates the hardware 13 normally. The device driver unit F2 operates the hardware 13 based on the data input from the read unit F11. The data input from the read unit F11 is, in other words, data acquired from the VM core 11a by the inter-core communication unit F1 through the downlink memory M1.

In addition, the device driver unit F2 outputs a bit string (in other words, raw data) corresponding to the signal input from the hardware 13 to the inter-core communication unit F1 (more specifically, the storage processing unit F12). The data as the bit string output by the device driver unit F2 to the inter-core communication unit F1 is output to the VM core 11a through the uplink memory M2.

It is preferable that the data output by the device driver unit F2 is provided with output source information indicating from which hardware 13 the data is acquired. This is because the VM core 11a, which is a receiver of the data, identifies which hardware 13 outputs the data. However, the output source information does not necessarily need to be included in the output data of the device driver unit F2. For example, in the configuration in which the storage area of the uplink memory M2 is divided and operated for each hardware 13, the VM core 11a can identify from which hardware 13 the stored data is output, based on a storage location of the data in the uplink memory M2 (in other words, the address).

Further, in the present embodiment, it is assumed that the device drivers corresponding to the various types of hardware 13 that implement the device driver unit F2 are implemented by a concealed source code. According to the above configuration, the virtual machine provided by the VM core 11a (in this case, the driving support ECU 1a) can be inhibited from being hacked from the outside. This is because, in a configuration in which the VM core 11 serving as a virtual machine and the device driver unit F2 serving as a device driver exchange raw data with each other, if the device driver unit F2 is formed of a concealed source code, it is difficult (virtually impossible) to enter the virtual machine by a normal hacking method.

Next, functions provided by the VM core 11a will be described. The VM core 11a includes an inter-core communication unit G1 and a processing execution unit G2 as functional blocks. The inter-core communication unit G1 is configured such that the VM core 11a bi-directionally communicates with the hardware control core 11x. The inter-core communication unit G1 includes a read unit G11 and a storage processing unit G12 as finer functional blocks. The read unit G11 is configured to read the stored data with reference to the uplink memory M2 based on the reception of the interrupt signal output from the storage processing unit F12 of the hardware control core 11x. The read unit G11 outputs the data read out from the uplink memory M2 to the processing execution unit G2. The read unit G11 corresponds to a virtual machine read unit of the present disclosure.

In addition, the storage processing unit G12 stores the data input from the processing execution unit G2 as it is in the downlink memory M1, and outputs an interrupt signal to the hardware control core 11x. The hardware control core 11x (more specifically, the read unit F11) reads the stored data with reference to the downlink memory M1 based on the reception of the interrupt signal output from the storage processing unit F12. It is assumed that the output of the interrupt signal associated with the data storage in the downlink memory M1 is performed without delay (that is, as quickly as possible) with respect to the completion of the data storage in the downlink memory M1. The storage processing unit G12 corresponds to a virtual machine storage processing unit of the present disclosure.

The processing execution unit G2 is a functional block that executes predetermined processing based on the data input from the hardware 13. The processing execution unit G2 includes an OS unit G21 and an application unit G22 as subdivided functional blocks. The OS unit G21 is configured to execute the guest OS 2a (in this case, the driving support OS) allocated to the VM core 11a. The OS unit G21 executes various arithmetic processing with the use of the data input from the read unit G11. The OS unit G21 outputs data as a result of arithmetic processing based on the data input from the read unit G11 to the inter-core communication unit G1 (more specifically, the storage processing unit G12). The OS unit G21 provides the data input from the read unit G11 to the application unit G22 as needed.

The application unit G22 is configured to execute application software (in this case, a driving support application) associated with the guest OS 2a. The application unit G22 executes predetermined arithmetic processing based on the data provided from the OS unit G21. The application unit G22 outputs data for the predetermined hardware 13 to the OS unit G21 in accordance with the result of the arithmetic processing.

The data for the hardware 13 output from the application unit G22 to the OS unit G21 is output to the inter-core communication unit G1 through the OS unit G21. In other words, when data for the hardware 13 is input from the application unit G22, the OS unit G21 outputs the input data to the inter-core communication unit G1. The data output from the processing execution unit G2 such as the OS unit G21 and the application unit G22 to the inter-core communication unit F1 is output to the hardware control core 11x through the downlink memory M1.

By the way, in the present embodiment, as an example, the processing execution unit G2 has a two-layered structure of the OS unit G21 that executes an OS and the application unit G22 that executes application software, but the present disclosure is not limited to the above structure. The processing execution unit G2 may include a middleware unit for executing middleware such as a protocol stack or a file system. A specific configuration of the processing execution unit G2 is derived from the software configuration of the virtual machine.

Each of the guest OSs 2 providing the virtual machine does not need to have a device driver. This is because the device driver unit F2 operates the hardware 13 based on the data output from each virtual machine. The device driver unit F2 corresponds to a configuration that controls the hardware 13 instead of each guest OS 2. For the above reasons, even if the guest OS 2 includes a device driver, the guest driver does not operate.

The data output by the processing execution unit G2 is preferably provided with destination information indicating which hardware 13 the data is intended for. This is because the hardware control core 11x identifies which hardware 13 is to be operated on the basis of the received data. However, the output data of the processing execution unit G2 need not necessarily include the destination information described above. For example, in the case where the storage area of the downlink memory M1 is further divided and operated for each hardware 13, the hardware control core 11x can identify which hardware 13 the stored data is intended for based on the storage location of the data in the downlink memory M1 (in other words, the address).

According to the configuration described above, the ECU 1 operates one of the four cores 11 included in the ECU 1 as the hardware control core 11x by the startup process caused by powering the ECU 1. The remaining three cores 11 execute different guest OSs 2 different from each other and function as virtual machines independent of each other. In other words, the ECU 1 virtually operates as multiple computers as a whole.

In the embodiment described above, the VM cores 11a to 11c and the hardware control core 11x are configured to communicate with each other by a memory access. In this manner, the device driver unit F2 operates the hardware 13 based on the raw data acquired from each of the VM cores 11a to 11c by the memory access. In addition, each of the VM cores 11a to 11c can store data in the shared memory unit 12 at an arbitrary timing.

In other words, each of the VM cores 11a to 11c can operate desired hardware at an arbitrary timing. Further, the data for the virtual machine output from the hardware 13 is provided to the VM core 11 to be output by the device driver unit F2 and the inter-core communication unit F1 through the shared memory unit 12. Reading of the data stored in the shared memory unit 12 is performed without delay caused by input/output of the interrupt signal.

In addition, each of the guest OSs 2a to 2c operates exclusively with one of the cores 11. In other words, one of the cores 11 is not shared by the multiple guest OSs 2. The respective guest OSs 2 can freely use the computational resources of the cores allocated to the guest OSs 2 themselves regardless of the operating conditions of other guest OSs 2.

In other words, according to the configuration described above, each of the guest OSs 2 can operate with the use of the computational resources provided in the core 11 dedicated to the guest OS 2, and leverage desired hardware at any time. Therefore, a possibility of delaying a communication between the guest OSs 2 and the hardware can be reduced.

Further, according to the configuration described above, the hardware control core 11x provides a function as a device driver for each of the VM cores 11a to 11c. Therefore, each of the guest OSs 2 need not have a device driver. In general, the device driver is a large-scale program module including a protocol, a CPU register, and the like. According to the present embodiment, since each of the guest OSs 2 does not need to include a device driver, a scale of the entire software stored in the ECU 1 can be reduced. In addition, the device driver for realizing the device driver unit F2 is realized by a concealed source code. Therefore, security against unauthorized accesses to the virtual machines operating on the ECU 1 can be enhanced.

Further, according to the configuration described above, the hardware 13 is operated without being associated with the virtual machines. In other words, each hardware 13 can be shared by each virtual machine. In accordance with the above configuration, the processing of associating the hardware and the virtual machine with each other, which has been required in the related virtualization system, can be omitted.

Incidentally, in a related virtualization system using the hypervisor, as a configuration for sharing one hardware 13 by multiple virtual machines, a configuration may be conceivable in which the virtual machines and the hypervisor are mutually communicably connected to each other by a virtual communication pipe in conformity with a predetermined communication standard (hereinafter referred to as an assumed configuration). The hypervisor in the assumed configuration controls the hardware based on the data received from the virtual machine, and performs processing for providing the data received from the hardware to the virtual machine.

However, in the assumed configuration, when the virtual machine communicates with the hardware, there is a need to execute processing (hereinafter referred to as bridge processing) for converting data/signals exchanged between the virtual machine and the hardware once into a format according to the communication standard between the virtual machine and the hypervisor.

For example, when the virtual machine outputs data for a certain hardware, the virtual machine converts the data into a format in accordance with a communication standard between the guest OS and the hypervisor once and outputs the converted data to the hypervisor. When the hypervisor outputs the data acquired from a certain hardware to the virtual machine, the hypervisor once converts the data into a format in accordance with the communication standard between the guest OS and the hypervisor and outputs the converted data. Since a predetermined time is required for such bridge processing, the bridge processing may cause a delay in communication between the virtual machine and the hardware.

On the other hand, according to the configuration of the present embodiment, there is no need to execute the bridge processing required in the assumed configuration described above. Since the bridge processing is not performed, there is no fear that the communication between the guest OS 2 and the hardware 13 is delayed due to the bridge processing according to the present embodiment. As described above, according to the present embodiment, a virtualization system can be provided in which the multiple virtual machines can share one hardware and a delay of the communication between the virtual machines and the hardware can be inhibited.

Incidentally, the communication delay due to the bridge processing can be reduced by increasing the performance of the processor 10. However, in the ECU 1 mounted on vehicle as in the present embodiment, from the viewpoint of environmental resistance and costs, it is more difficult to use a processor having a higher performance than computers used in offices and homes. In particular, the ECU 1 for controlling the traveling of the vehicle is used in the vicinity of a heat source such as an engine (that is, in high-temperature environments). When an attempt is made to realize the assumed configuration with a processor that can be used in a high-temperature environment, a communication delay caused by the bridge processing becomes remarkable, resulting in a possibility that a desired communication performance cannot be obtained.

On the other hand, in the configuration of the present embodiment, since the bridge processing does not exist as described above, even if the virtualization system is constructed with the use of a processor that can be used in a high-temperature environment, the communication delay between the hardware and the virtual machine hardly poses a problem. In other words, the present embodiment can be more useful configured than a case in which a virtualization system is configured with the use of a physical machine incorporated in a vehicle. In particular, the configuration of the present disclosure is suitable when the ECU relating to the travel control of the vehicle is virtualized.

While the embodiments of the present disclosure have been described above, the present disclosure is not limited to the embodiments described above, and various modifications to be described below are included in the technical scope of the present disclosure, and may be implemented by various modifications within a scope not departing from the spirit described below.

Members having the same functions as those described in the embodiments described above are denoted by the same reference numerals, and descriptions thereof are omitted. Further, when only a part of the configuration is referred to, the configuration of the embodiments described above can be applied to other parts.

(Modification 1)

In the embodiment described above, a mode has been disclosed in which the memory in which the hardware control core 11x stores the data for the VM core 11a and the memory in which the VM core 11a stores the data for the hardware control core 11x are prepared separately in a software fashion or a hardware fashion. Alternatively, those memories may not be separated from each other. In other words, the memory in which the hardware control core 11x stores the data for the VM core 11a and the memory in which the VM core 11a stores the data for the hardware control core 11x may be the same memory.

(Modification 2)

Figure 5:
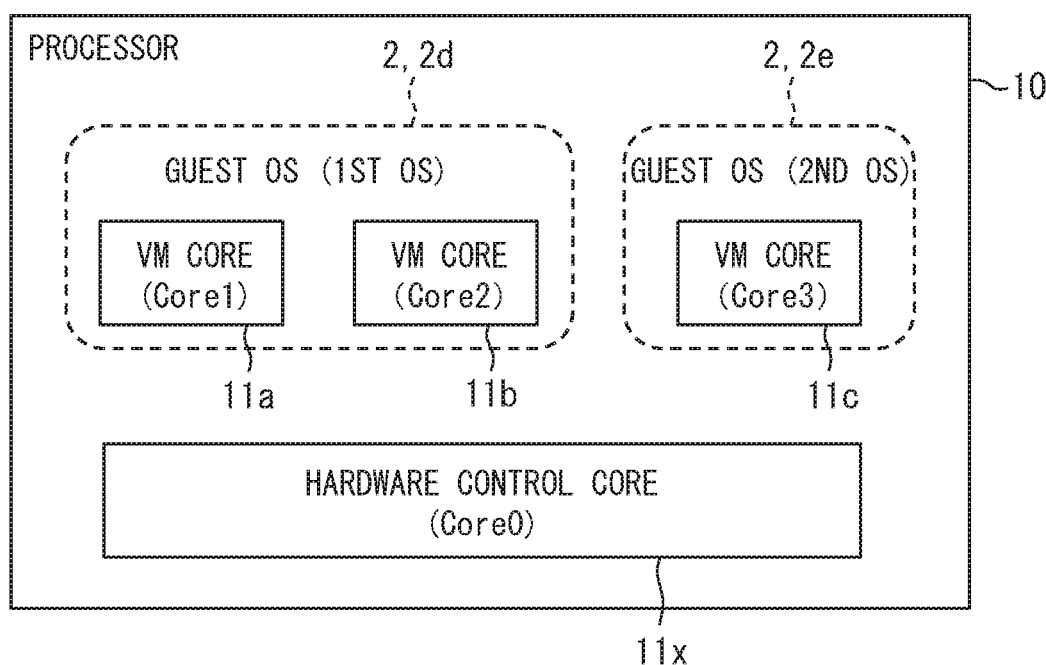
FIG. 5 is a diagram showing a modification of an allocation mode of a guest OS.

In the embodiment described above, a manner in which one VM core 11 is allocated to one guest OS 2 has been described. In other words, a configuration is disclosed in which the guest OSs 2 and the VM cores 11 are associated with each other in a one-to-one manner. However, the manner in which the VM cores 11 are allocated to the guest OSs 2 is not limited to the above example. As shown in FIG. 5, multiple VM cores 11 may be allocated to a single guest OS 2. FIG. 5 shows a configuration in which two VM cores 11a and 11b are allocated to the first OS 2d serving as the guest OS 2, and one VM core 11c is allocated to the second OS 2e serving as the guest OS 2.

(Modification 3)

In the above description, a configuration in which the virtualization system according to the present disclosure is applied to the ECU 1 that is mounted on the vehicle in use has been disclosed, but the present disclosure is not limited to the above example. The virtualization system is also applicable to computers used in offices, homes, and the like.

In other words, in the present embodiment, a configuration in which the guest OS 2 is an embedded OS (in other words, a dedicated OS) for providing a limited function according to an application has been disclosed, but the guest OS 2 may be an OS (so-called general-purpose OS) used in a general-purpose computer. The embedded OS is, in other words, an OS that supports the execution of one or more specific application software. The general-purpose OS corresponds to an OS that supports a wide variety of application software that can be installed by a user.

In the above, the embodiment, the configuration, an aspect of a virtualization system, a virtualization program, and a storage medium according to the present disclosure are exemplified. However, the present disclosure is not limited to every embodiment, every configuration and every aspect related to the present disclosure are exemplified. For example, embodiments, configurations, and aspects obtained from an appropriate combination of technical elements disclosed in different embodiments, configurations, and aspects are also included within the scope of the embodiments, configurations, and aspects of the present disclosure.

What is claimed is:

1. A virtualization system in which a plurality of virtual machines operate on a single physical machine having a plurality of cores, the virtualization system comprising:
   a plurality of hardware devices;
   a hardware control core that is a core of the plurality of cores, and controls operation of the plurality of hardware devices;
   a plurality of virtual machine cores that are each a core of the plurality of cores, each virtual machine core operating a guest OS that is an OS of a virtual machine; and
   a shared memory configured to be accessed by the hardware control core and the plurality of virtual machine cores concurrently and in parallel,
   wherein:
   one of the virtual machines is configured to operate exclusively with one or a plurality of the virtual machine cores;
   the hardware control core includes a device driver unit that is configured to control the operation of each of the plurality of hardware devices by executing a device driver corresponding to each of the plurality of hardware devices;
   the guest OS operating on each virtual machine has no device driver, and controls the plurality of hardware devices through the device driver unit;
   communication between the hardware control core and the virtual machine cores is performed by storing data in the shared memory and reading the stored data from the shared memory;
   the device driver unit controls the operation of the plurality of hardware devices based on the data in the shared memory stored by the virtual machines;
   the device driver unit stores data received from the plurality of hardware devices in the shared memory to provide the virtual machine cores with the stored data;
   the shared memory includes an uplink memory corresponding to each of the virtual machine cores and a downlink memory corresponding to each of the virtual machine cores, the uplink memory storing data from the hardware control core to the corresponding virtual machine core and the downlink memory storing data from the corresponding virtual machine core to the hardware control core;
   the hardware control core is configured to store data in each uplink memory and is prohibited from storing data in each downlink memory; and
   each virtual machine core is configured to store data in the corresponding downlink memory and is prohibited from storing the data in the corresponding uplink memory.

2. The virtualization system according to claim 1, wherein:
   the hardware control core further includes a controller storage processing unit that stores data acquired from the plurality of hardware devices by the device driver unit in the shared memory, and outputs a first interrupt signal to the virtual machine cores in response to the data being stored in the shared memory, the first interrupt signal requesting to read the data stored in the shared memory; and the hardware control core further includes a controller read unit that reads the data stored in the shared memory in response to input of a second interrupt signal from the virtual machine cores;

the virtual machine cores each include a virtual machine read unit that reads the data stored in the shared memory in response to reception of the first interrupt signal output from the controller storage processing unit;

the virtual machine cores each include a processing execution unit that executes predetermined arithmetic processing using the data read by the virtual machine read unit and outputs data directed to at least one of the hardware devices as a result of the arithmetic processing; and the virtual machine cores each include a virtual machine storage processing unit that stores the data output from the processing execution unit in the shared memory, and outputs the second interrupt signal to the hardware control core in response to the data being stored in the shared memory.

3. The virtualization system according to claim 1, wherein:
the physical machine is computing machinery mounted on a vehicle; and
the guest OS is one of an OS for controlling a predetermined electronic device mounted on the vehicle or an OS for providing a function related to communication outside of the vehicle.

4. The virtualization system according to claim 3, wherein:
the device driver is implemented with concealed source code.

5. A non-transitory tangible computer readable storage medium storing a program for operating a physical machine as the virtualization system according to claim 1, the physical machine including the plurality of cores, a random access memory, and a physical layer having the plurality of hardware devices, the program comprising:
a core allocation unit that sets one of the plurality of cores to be the hardware control core and sets the remaining cores to be the plurality of virtual machine cores; and
a shared memory set unit that sets a part or all of a storage area of the random access memory to the shared memory.

6. A virtualization system in which a plurality of virtual machines operate on a single physical machine having a plurality of cores, the virtualization system comprising:
a plurality of hardware devices;
a hardware control core that is a core of the plurality of cores, and controls operation of the plurality of hardware devices;
a plurality of virtual machine cores that are each a core of the plurality of cores, each virtual machine core operating a guest OS that is an OS of a virtual machine; and
a shared memory configured to be accessed by the hardware control core and the plurality of virtual machine cores concurrently and in parallel, wherein:
one of the virtual machines is configured to operate exclusively with one or a plurality of the virtual machine cores;

the hardware control core includes a device driver unit that is configured to control the operation of each of the plurality of hardware devices by executing a device driver corresponding to each of the plurality of hardware devices;

the guest OS operating on each virtual machine has no device driver, and controls the plurality of hardware devices through the device driver unit;

communication between the hardware control core and the virtual machine cores is performed by storing data in the shared memory and reading the stored data from the shared memory;

the device driver unit controls the operation of the plurality of hardware devices based on the data in the shared memory stored by the virtual machines;

the device driver unit stores data received from the plurality of hardware devices in the shared memory to provide the virtual machine cores with the stored data;

the hardware control core further includes a controller storage processing unit that stores data acquired from the plurality of hardware devices by the device driver unit in the shared memory, and outputs a first interrupt signal to the virtual machine cores in response to the data being stored in the shared memory, the first interrupt signal requesting to read the data stored in the shared memory;

the hardware control core further includes a controller read unit that reads the data stored in the shared memory in response to input of a second interrupt signal from the virtual machine cores;

the virtual machine cores each include a virtual machine read unit that reads the data stored in the shared memory in response to reception of the first interrupt signal output from the controller storage processing unit;

the virtual machine cores each include a processing execution unit that executes predetermined arithmetic processing using the data read by the virtual machine read unit and outputs data directed to at least one of the hardware devices as a result of the arithmetic processing; and the virtual machine cores each include a virtual machine storage processing unit that stores the data output from the processing execution unit in the shared memory, and outputs the second interrupt signal to the hardware control core in response to the data being stored in the shared memory.

* * * * *